O. MALCHER.
COMPUTING AND PRINTING SCALE.
APPLICATION FILED JAN. 18, 1915.

1,335,066.

Patented Mar. 30, 1920.
8 SHEETS—SHEET 1.

O. MALCHER.
COMPUTING AND PRINTING SCALE.
APPLICATION FILED JAN. 18, 1915.

1,335,066.

Patented Mar. 30, 1920.
8 SHEETS—SHEET 2.

Witnesses:
Inventor:
Otto Malcher
By Brown Darrow & Hinkle
Attys.

O. MALCHER.
COMPUTING AND PRINTING SCALE.
APPLICATION FILED JAN. 18, 1915.
1,335,066.
Patented Mar. 30, 1920.
8 SHEETS—SHEET 3.
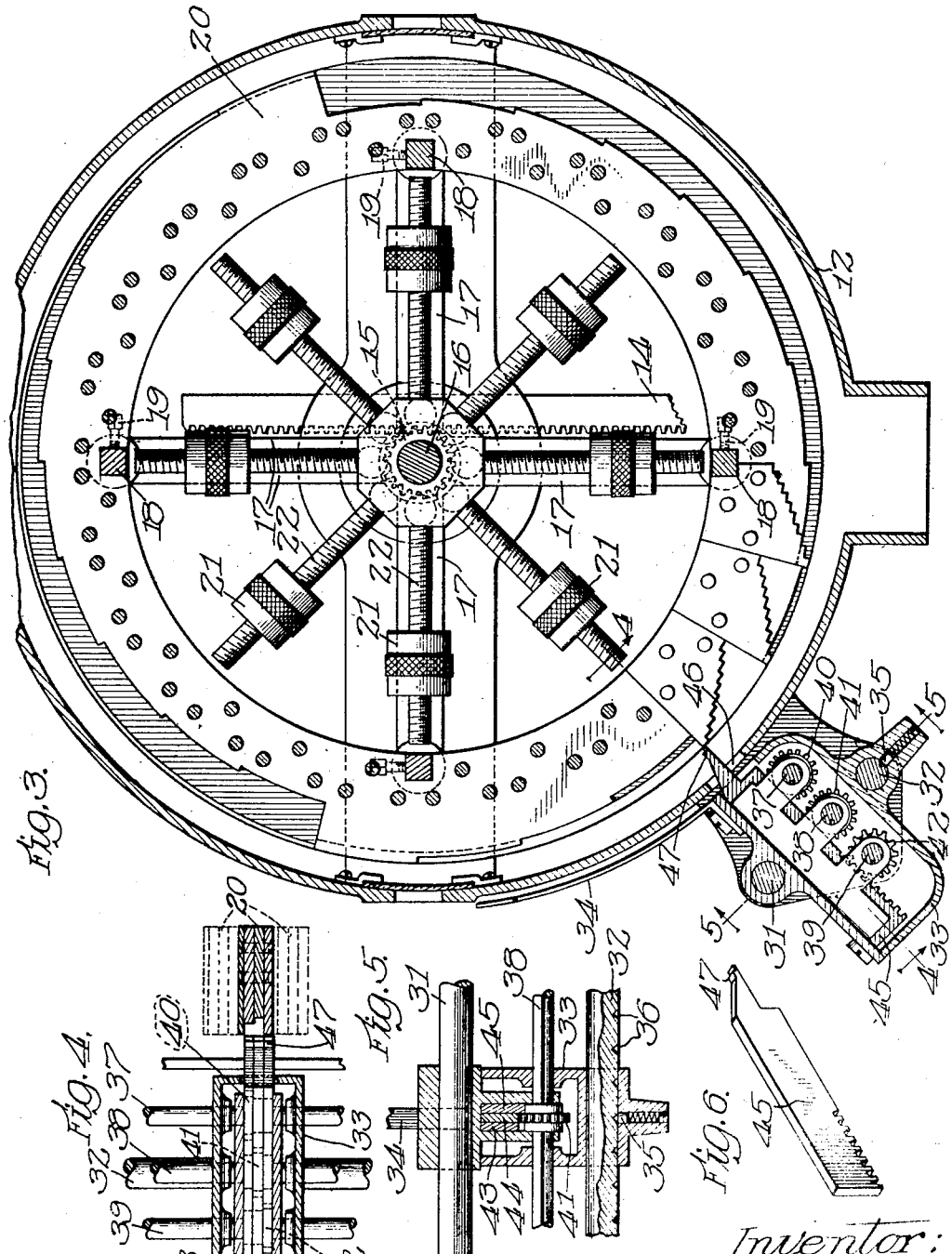
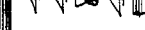

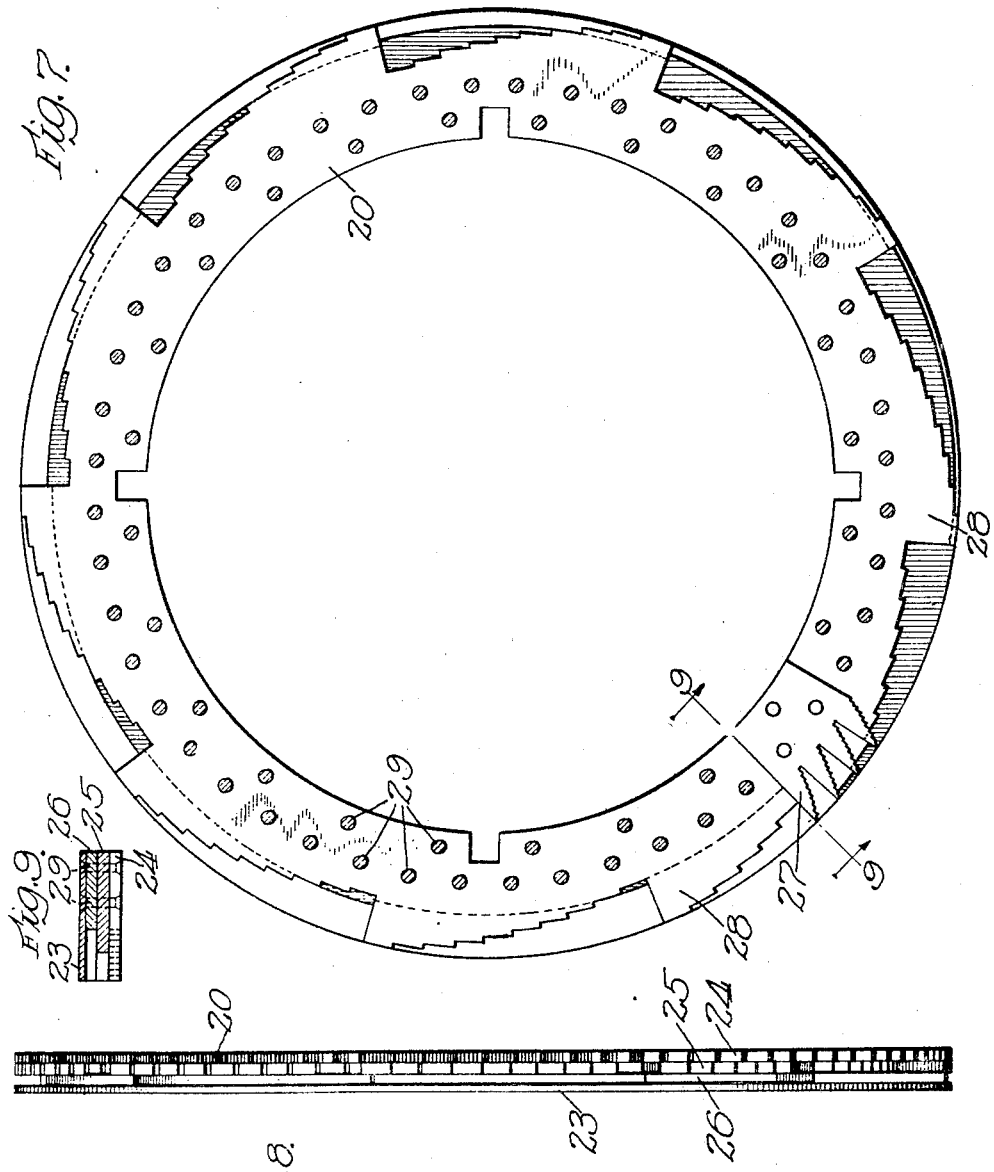

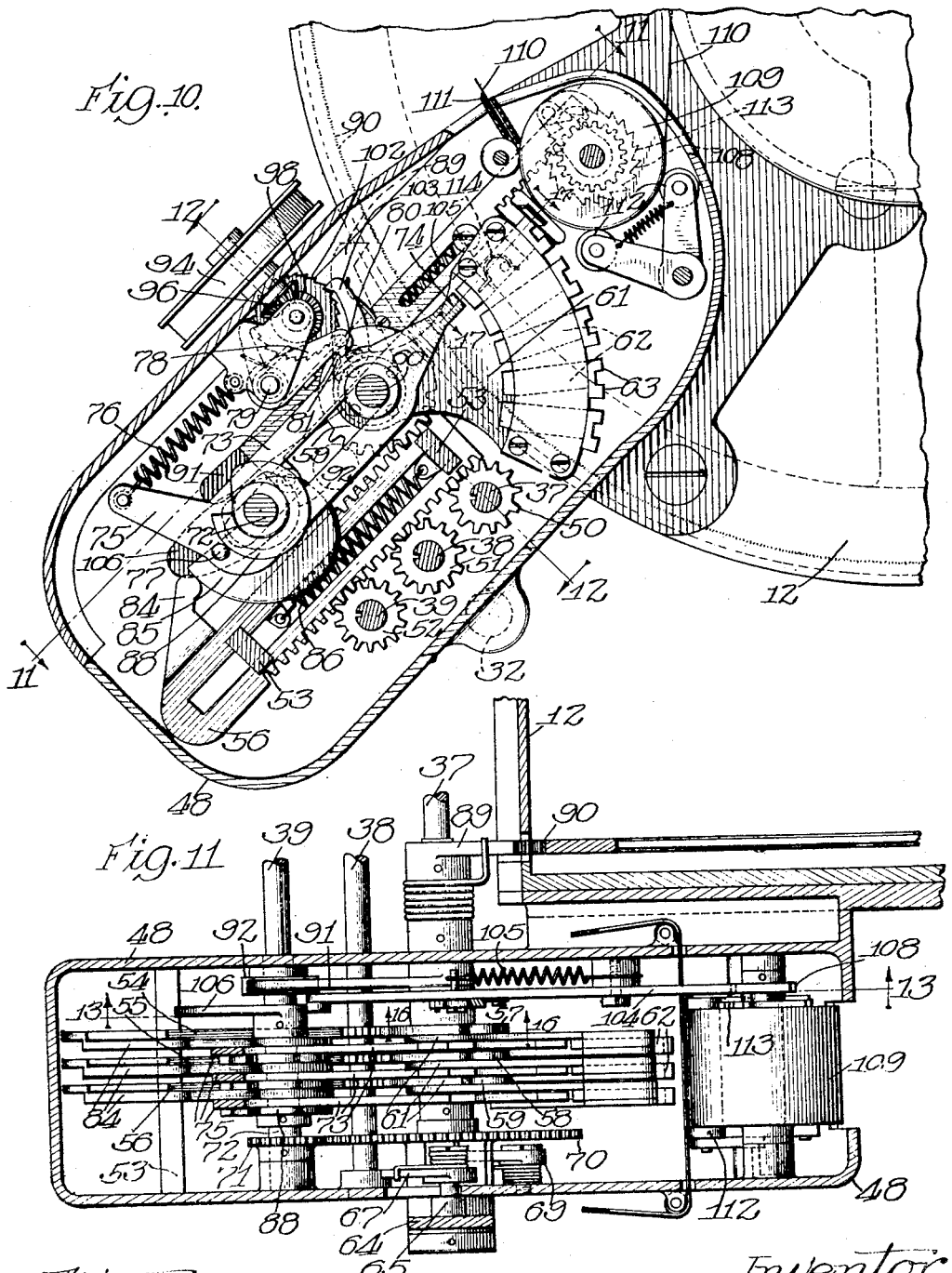

O. MALCHER.
COMPUTING AND PRINTING SCALE
APPLICATION FILED JAN. 18, 1915.
1,335,066.
Patented Mar. 30, 1920.
8 SHEETS—SHEET 6.
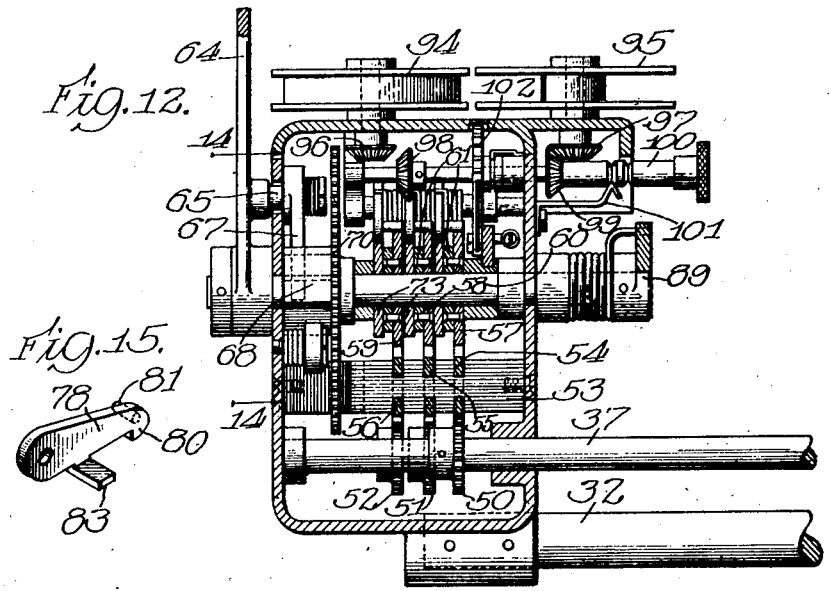
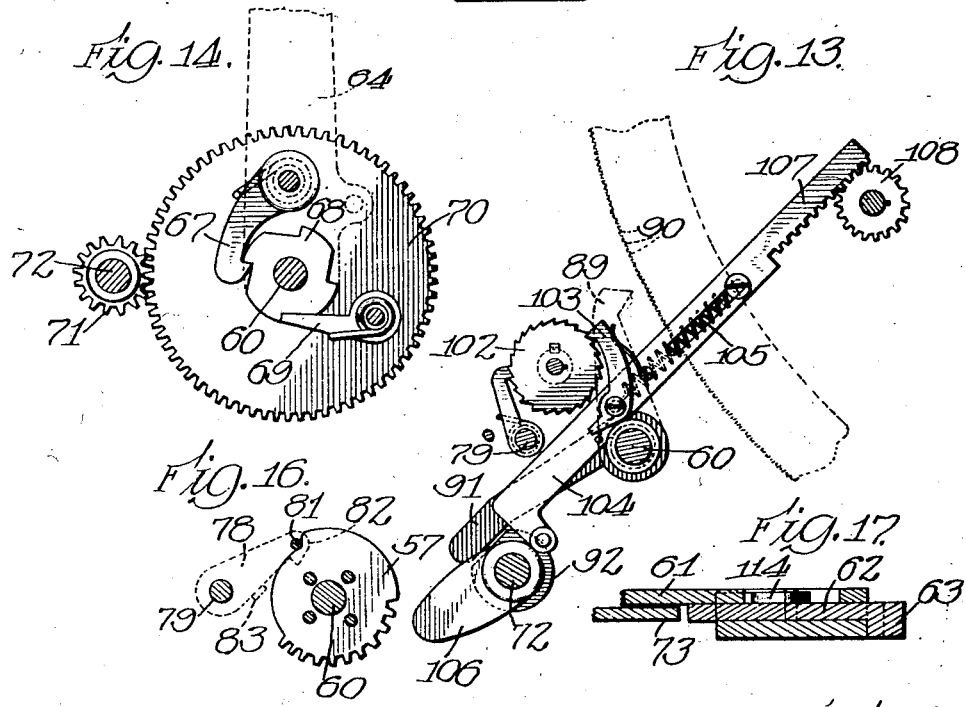
Witnesses:
Inventor:
Otto Malcher
By: Brown, Nissen & Sprinkle
Attys.

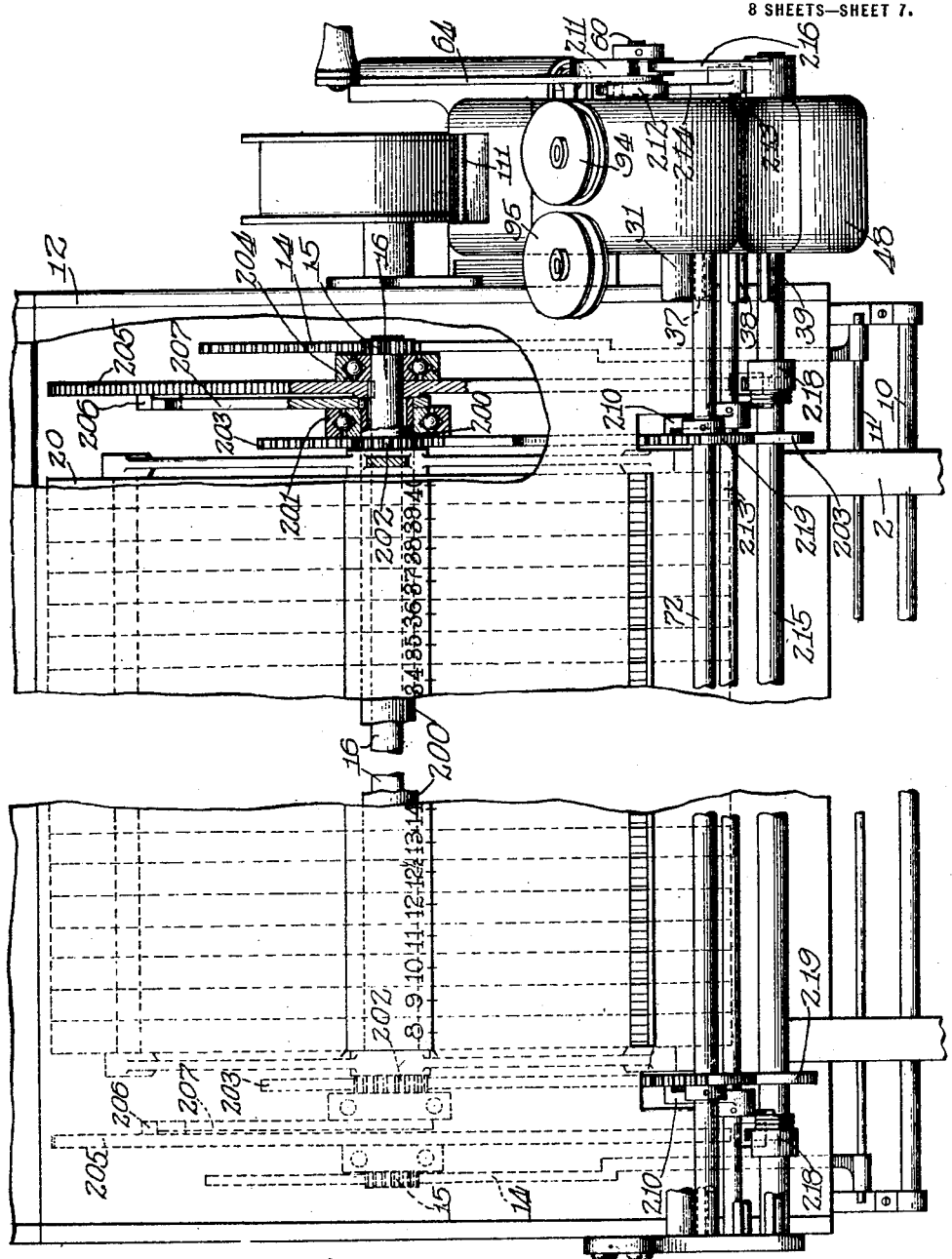

O. MALCHER.
COMPUTING AND PRINTING SCALE.
APPLICATION FILED JAN. 18, 1915.
1,335,066.
Patented Mar. 30, 1920.
8 SHEETS—SHEET 8.
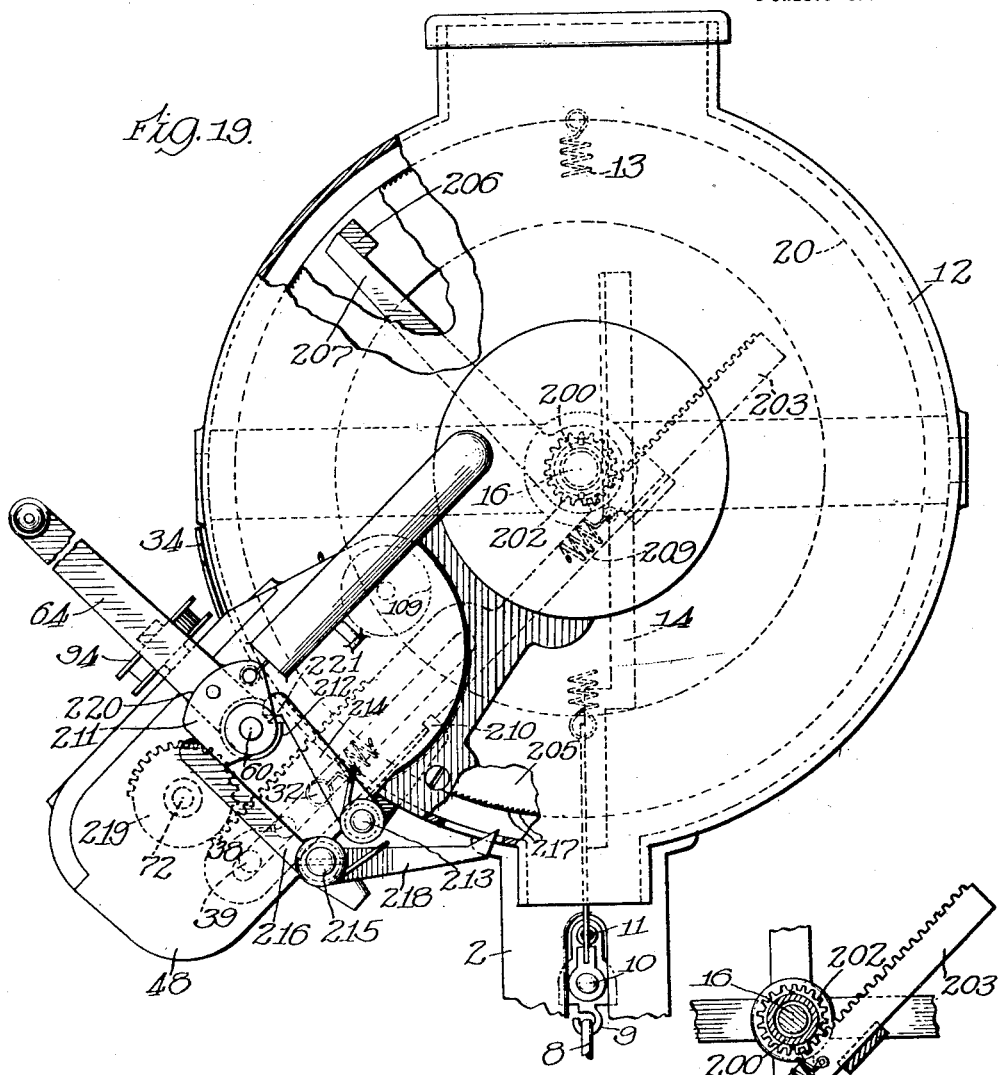
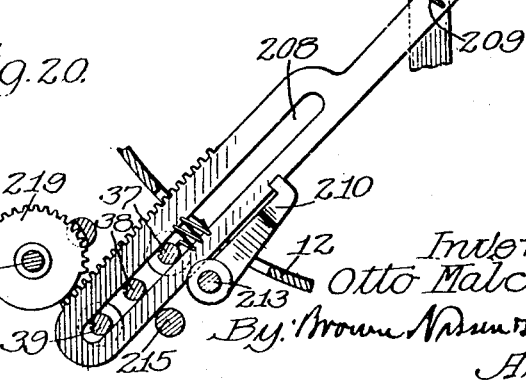
Witnesses:
G. W. Domarus Jr.
A. J. Crane
Inventor:
Otto Malcher
By Brown Nissen Sprinkle
Attys.

UNITED STATES PATENT OFFICE.

OTTO MALCHER, OF CHICAGO, ILLINOIS, ASSIGNOR TO MALCHER ADDING MACHINE COMPANY, OF CHICAGO, ILLINOIS, A CORPORATION OF ILLINOIS.

COMPUTING AND PRINTING SCALE.

1,335,066.      Specification of Letters Patent.      Patented Mar. 30, 1920.

Application filed January 18, 1915. Serial No. 2,882.

*To all whom it may concern:*

Be it known that I, OTTO MALCHER, a citizen of the United States, residing in Chicago, county of Cook, and State of Illinois, have invented certain new and useful Improvements in Computing and Printing Scales, of which the following is a specification.

This invention relates to computing scales and comprises mechanism for computing the value of articles weighed thereon, and printing the value thus computed.

The invention consists substantially in the combination and arrangement herein described, illustrated in the accompanying drawings and more particularly set forth in the appended claims.

In the drawings, Figure 1 is a fragmentary front elevation of a scale provided with the computing and printing mechanism of this invention.

Fig. 3 is a sectional elevation on the line 3—3 of Fig. 1.

Fig. 4 is a section on line 4—4 of Fig. 3.

Fig. 5 is a section on line 5—5 of Fig. 3.

Fig. 6 is a perspective of one of the racks for controlling the printing mechanism.

Fig. 7 is an elevation of one of the disks of the computing drum.

Fig. 8 is an elevation showing the edge of the disk shown in Fig. 7.

Fig. 9 is a section on line 9—9 of Fig. 7.

Fig. 10 is a section on line 10—10 of Fig. 1 showing the printing mechanism.

Fig. 11 is a section on line 11—11 of Fig. 10.

Fig. 12 is a section on line 12—12 of Fig. 10.

Fig. 13 is a fragmentary sectional view on line 13—13 of Fig. 11.

Fig. 14 is a fragmentary sectional view on line 14—14 of Fig. 12.

Fig. 15 is a perspective view of the locking dog for the printing hammers.

Fig. 16 is a fragmentary sectional view on line 16—16 of Fig. 11; and

Fig. 17 is a fragmentary sectional view on line 17—17 of Fig. 10.

Fig. 18 is a fragmentary front elevation of a computing scale having a modified form of the invention applied thereto.

Fig. 19 is an end elevation of a modified form of the invention shown in Fig. 18.

Fig. 20 is a fragmentary sectional view showing the rack for moving the drum, in a modified form of the invention.

Figure 1:
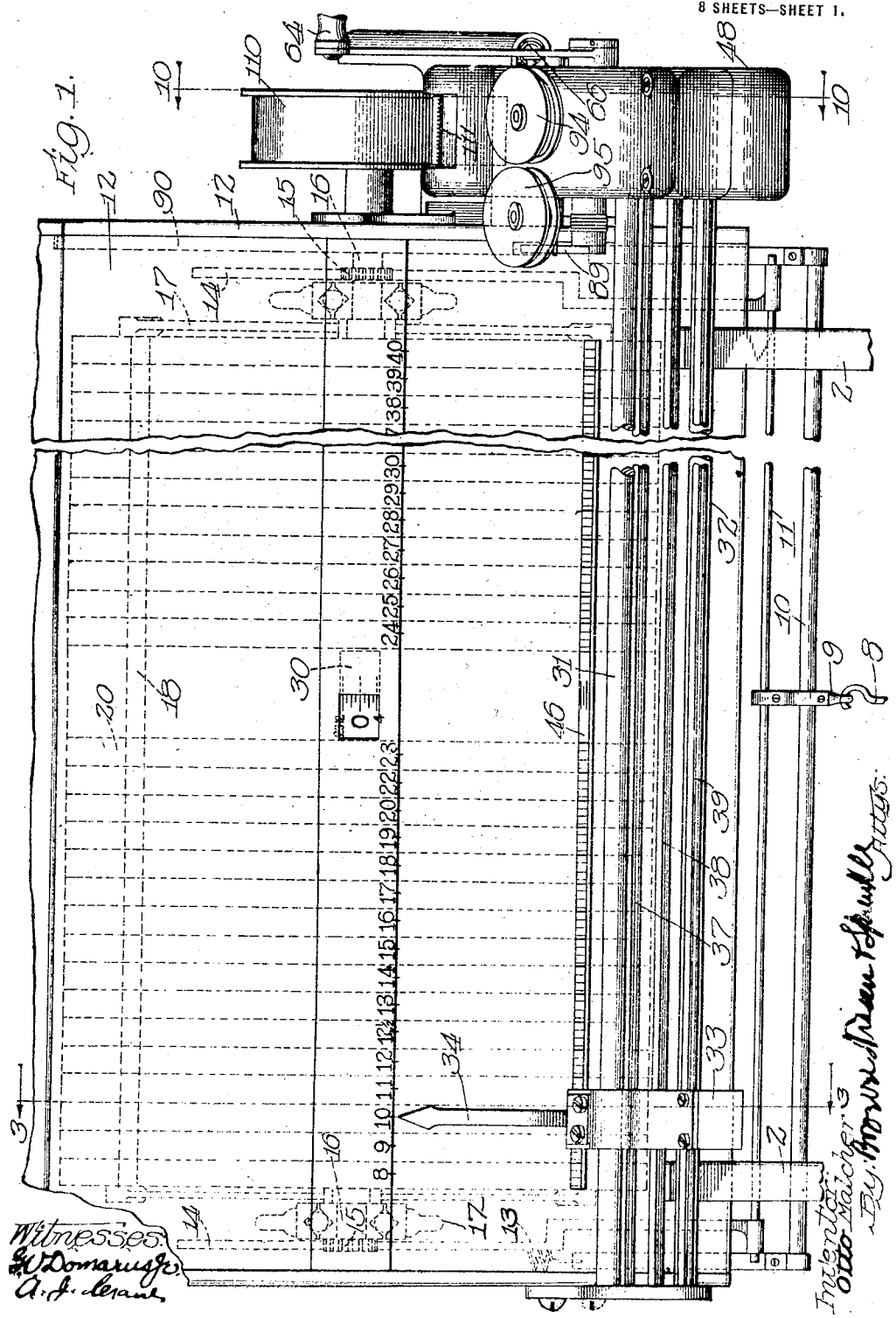

In the present embodiment, my invention is shown as applied to a spring scale similar to that in common use in connection with computing scales, and in the drawing the numeral 1 designates a base plate upon which the scale to which this invention is applied, is mounted. At each end of the base plate are uprights 2 for supporting the spring balances and the computing mechanism. A scale beam 3 (Fig. 2) is pivoted at 4 on an upright 5 supported on the base plate 1. Carried by the beam 3, in the usual manner, is a scale pan 6 pivoted on the beam at 7. Fastened to the end of the scale beam is a rod 8 extending upwardly therefrom and connected to a hook 9 which is in turn carried by rods 10 and 11 as shown in Fig. 1. The casing 12 is supported by the uprights 2 and this casing has secured thereto at each end near the upper portion thereof, balance springs 13. It will be seen that when an article to be weighed is placed on the pan 6, a portion of the weight thereof will be sustained by the springs 13 which will yield an amount proportional to the weight of the article to be weighed. Secured to the rod 11 at each end thereof, is a rack 14 (Figs. 1, 2 and 3) meshing with pinions 15 secured to the shaft 16 to rotate therewith. The shaft 16 is journaled in the casing 12 and has arms 17 extending radially therefrom as shown in Figs. 1 and 3. Extending lengthwise of the scale and connecting the arms 17 at each end thereof, are a plurality of rectangular bars 18. The bars 18 are held in place by set screws 19 in the ends of the arms 17. The bars 18 carry a plurality of circular rings or disks designated generally by the numeral 20, one of which disks is shown in detail in Figs. 7, 8 and 9. These disks are provided with rectangular openings coöperating with the bars 18 to hold the disks in place, and a sufficient number of the disks is provided to completely fill the space between the arms 17. It will be seen from the construction that these disks can easily be removed and exchanged for other disks when desired by loosening the set screws 19 and sliding the bars 18 out of place. When the disks are all in place, a drum is formed adapted to be rotated by the racks 14 and the amount of rotation, as will be seen, will be proportional to the weight of the article upon the scale pan 6. As will appear later, the metal in the disks 20 is unequally distributed about the axis of the drum and a series of weights 21 (Fig. 3) is mounted on radial screws 22 secured to the shaft 16 for the purpose of overcoming the unequal distribution of the metal in the disks 20. As will be apparent, the weights 21 may be moved radially on the screws 22 to secure a perfect balance of the drum. Each of the disks 20 is composed of four separate rings (Figs. 8 and 9). The ring 23 of each disk is uniform throughout the entire circumference of the drum and constitutes a supporting member to which the other rings of the disk 20 are secured. The configuration of the other rings of the disk 20 will depend upon the position of the disk longitudinally of the drum. As will be seen from Fig. 1, the casing surrounding the drum carries a series of numbers ranging, in the embodiment shown, from 8 to 40. These numbers represent the price per pound of articles to be weighed upon the scale. It will be evident that the range of numbers may be varied to adapt any particular scale to the class of goods with which it is intended to be used. One disk 20 is provided for each number on the face of the casing representing article prices, and the construction of the rings of which the disk is composed, will be controlled by the number representing the price to which the disk corresponds. The disk shown in Fig. 7 is the one used in connection with the number 40, that is for calculating articles the price of which is forty cents per pound. In this disk, the ring 24, which may be called the units ring, has a series of stop members 27 thereon and each of these stop members is provided with a series of steps, ten in number, which constitute stop shoulders for a purpose to be explained. In the drawing only four of these stop members 27 have been shown, but it will be understood that they extend entirely around the ring 24. The ring 25, which may be called the tens ring, is also provided with a series of stop members 28 and these stop members are likewise provided with a series of steps which are ten in number, one step being provided for each of the stop members 27. The ring 26, which may be called the hundreds ring, is also provided with a series of steps, there being one step for each of the stop members 28 of the ring 25. All of these rings are secured together by rivets 29 and the complete disk is held in place, as previously explained, by the bars 18. Near the center of the drum, a ring 30 is provided which carries a scale marked in pounds, so that the weight of the article may be read directly on this scale, as will be clearly understood.

Extending longitudinally of the scale, (Figs. 1 and 3) are two bars 31 and 32, and mounted to slide on these bars is a casing 33 carrying an indicator 34 and provided with a spring detent 35 (Fig. 5). The bar 32 is provided with a series of depressions 36 adapted to coöperate with the detent 35 to accurately locate the casing 33 relative to the price numerals on the front of the casing, and also to the disks 20 on the scale drum. Extending longitudinally of the scale, and free to rotate, are a number of shafts 37, 38 and 39, each provided with a keyway extending the full length thereof. As shown in Figs. 4, 5 and 6, these shafts extend through the casing 33 and have mounted thereon within the casing, pinions 40, 41 and 42 respectively. These pinions are free to slide along the shafts, but are held for rotation therewith. Coacting with the pinions, are a series of racks 43, 44 and 45. These racks are free to slide in the casing in a direction radial to the scale drum and are held in position by their respective pinions, 40, 41 and 42, as will be apparent from Figs. 3, 4 and 5. One of these racks is shown in perspective in Fig. 6. In the front of the drum casing, as shown in Figs. 1 and 3, and running the full length thereof, is a slot 46, through which the racks are adapted to be projected to coöperate with the disks 20 in a manner which will be later explained. Each of the racks is provided with a contacting finger 47 adapted to coöperate with the steps on the disks 20.

When the indicator 34 is moved opposite a price mark on the drum casing and the detent 35 has entered one of the depressions 36, the rack 43 will be held opposite the units ring of the disk corresponding to the price mark designated by the indicator, the rack 44 will be opposite the tens ring and the rack 45 will be opposite the hundreds ring. If, when the casing 33 is thus set, an article is placed upon the scale pan, the scale drum will be rotated a distance corresponding to the weight of the article. If the price of the article is ten cents per pound, the casing 33 will be set opposite the tens disk (as shown in Figs. 1 and 3) and the disk will be rotated a distance corresponding to the weight of the article. A unit stop in each instance extends circumferentially around the drum a distance corresponding to the amount the drum will be rotated by the weight, the value of which, for the particular price, is ten cents, and each tens stop extends around the drum a distance corresponding to a weight the value of which is one dollar. Since the units stop and the tens stop are each provided with ten steps, it will be seen that one step will move beneath the units rack 43 for each cent's worth of the article upon the scale pan, and one step of the tens disk will move beneath the tens rack for each ten cents' worth of the article upon the scale pan. It will now be apparent that after the article has been placed upon the scale pan, and the racks 43, 44 and 45 released, in a manner to be later explained, and permitted to move toward the scale drum, the units rack will be permitted to move inwardly a distance corresponding to one step on the unit stop for each cent's worth of the article upon the pan, provided the amount is less than ten cents. If the amount is ten cents exactly, the units rack will be stopped by the first step on the second unit stop and there will be no movement of this rack. If the amount is between ten and twenty cents, the movement of the units rack will be controlled by the second stop on the units ring and will correspond to the number in the units place of the value of the article. If the price is between twenty and thirty cents, the units rack will be controlled by the third stop, and so on around the drum. In a similar manner, the tens stop will move a distance proportional to the digit in the tens order of the value of the article, and the hundreds stop will move a distance proportional to the digit in the hundreds order of the value of the article. The length of the steps for each disk will, of course, be made inversely proportional to the prices upon the casing corresponding to the particular disk.

Secured to the scale frame (as shown at the right in Fig. 1) is a casing 48 in which the printing mechanism is mounted. The shafts 37, 38 and 39 extend into the casing 48 (as shown in Figs. 10, 11 and 12) and these shafts carry within the casing, pinions 50, 51 and 52 respectively. Mounted for sliding movement on bars 53 within the casing are a series of racks, 54, 55 and 56, adapted to mesh with the pinions 50, 51 and 52 respectively. Meshing with the racks 54, 55 and 56 respectively, are mutilated gears 57, 58 and 59 respectively. These mutilated gears are mounted for rotation upon the shaft 60 extending across the casing 48 as shown in Figs. 10, 11 and 12. Riveted to these mutilated gears are a series of type segments 61 and each segment carries a number of type bars 62 having printing faces 63. Each segment has ten type bearing faces provided with numerals ranging from zero to nine. It will now be seen that when the racks 43, 44 and 45 are permitted to move forwardly to coöperate with the disks on the scale drum, the racks 54, 55 and 56 will be moved a corresponding distance and the type disk 61 will also be rotated correspondingly to bring the printing faces 63 into position to print a numeral corresponding to the distance through which the corresponding racks have moved.

Figure 2:
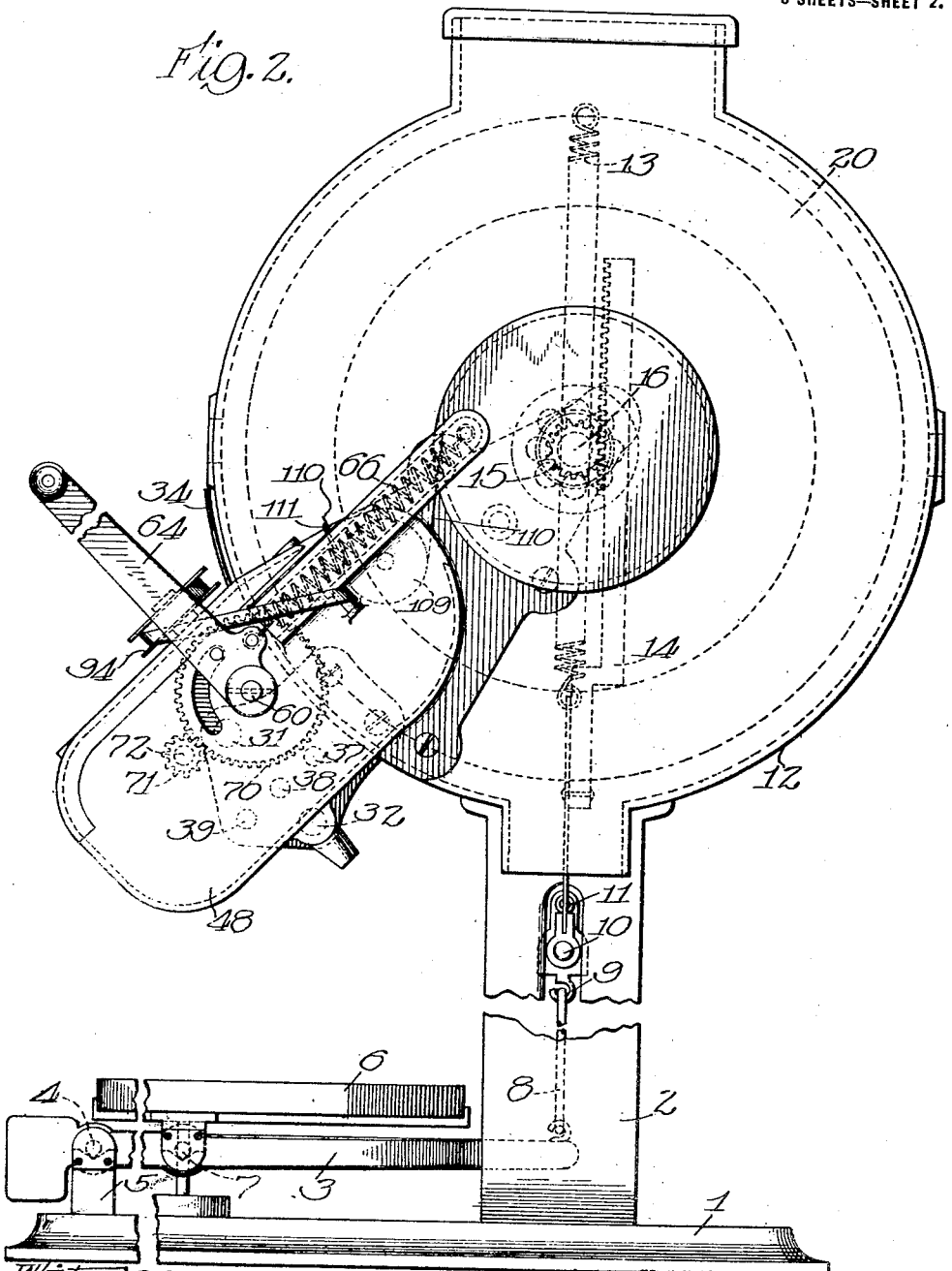
Fig. 2 is an end elevation of the scale shown in Fig. 1.

Mounted on the shaft 60 to rotate thereon, is a hand crank 64 provided with a lug 65 (Fig. 12) extending into a slot in the casing 48 (Fig. 2) to limit the movement of the hand crank to a quarter revolution. The hand crank 64 is held in the position shown in Fig. 2 by a spring 66. Secured to the lug 65 within the casing, is a pawl 67 coöperating with a ratchet 68 rigidly mounted on the shaft 60 (Figs. 12 and 14). A detent 69 is pivoted to the casing 48 to prevent backward movement of the ratchet 68. It will be seen that when the hand crank 64 is drawn to the left (as shown in Fig. 2) the pawl 67 will ride over the notches in the ratchet 68 and no motion will be imparted to the shaft 60. When, however, the hand crank is allowed to return under the influence of the spring 66, the pawl 67 will contact with the ratchet 68 and rotate the shaft 60 a quarter of a revolution. Secured to the shaft 60 to rotate therewith, is a gear 70 and meshing with the gear 70 (Figs. 11 and 14) is a pinion 71 rigidly mounted on the shaft 72 carried in bearings in the casing 48. The gears 70 and 71 are so related to one another that the shaft 72 will be given one complete revolution for each quarter turn of the shaft 60.

Mounted to slide on the shafts 60 and 72 (as shown in Fig. 10) are a number of printing hammers or bars 73 (Figs. 10 and 12), one hammer being provided for each of the printing segments 61, and so located that the point 74 will strike the type bars 62 when they are in printing position. These printing hammers each carry an upwardly extending tail 75 (Fig. 10) to which is attached a spring 76 normally tending to draw the bars forwardly or to the right in Fig. 10. Lugs 77 are attached to the printing hammers and are adapted to coöperate with cams 88 secured to the shaft 72 to rotate therewith. A plurality of catch members 78 is provided one for each of said printing hammers, pivotally mounted on the shaft 79 and carrying catches 80 coöperating with projections on said printing hammers. These catches are held in yielding contact with the printing hammers and normally hold them in inactive position. Each of said catch members 78 carries a projecting pin 81 which rests against a cam projection 82 on the mutilated gears 57, 58 and 59 as shown in Figs. 10 and 16. It will be seen that when one of these mutilated gears begins to rotate, the first result of such rotation will be to raise the catch member 78 to disengage it from the printing hammer corresponding to said gear. Each of the catch members 78 carries a laterally projecting lug 83 which extends beneath the next adjacent catch member of lower decimal order, so that when one of the catch members 78 is released, all of the catch members of lower decimal order will also be released. Carried by each of the racks 54, 55 and 56, is an upwardly projecting member 84 adapted to coöperate with cam 85 mounted on shaft 72 to rotate therewith. Springs 86 normally tend to draw the racks 56 forwardly in Fig. 10, such movement being prevented by the cam 85, except at such times as it is desirable for such movement to be permitted. From the shape of the cam 85 (shown in Fig. 10) it will be apparent that when the shaft 72 is rotated counter-clockwise in that figure, by the return movement of the crank 64, previously referred to, the first effect will be to disengage the projections 84 from the cam 85 and allow the racks 54, 55 and 56 to be moved forwardly by the influence of the springs 86 until such movement is stopped by the pinions 50, 51 and 52. Since the movement of the pinions 50, 51 and 52 is controlled by the racks 43, 44 and 45, as previously explained, it will be apparent that the amount of movements of the racks 54, 55 and 56, will be proportional to the movements of the racks 43, 44 and 45. As soon as the racks 54, 55 and 56 begin to move, the corresponding catch members 78 will be released by the cam projection 82 on the mutilated gears, leaving the printing hammers corresponding to the racks moved, free to move forwardly except as restrained by the cam 88 coöperating with the lug 77 (as shown in Fig. 10). Shortly after the release of the projections 84 by the rotation of the shaft 72, the lug 77 will be freed from the cam 88 and the printing hammers 73 will thus be permitted to move forwardly to strike the type bars 62 and print the number set up by the movement of the racks 56. If no number has been set up in any decimal order, the printing hammer of that order will be held from movement by the catch member 78 and no printing will take place in that order, unless a number has been set up in a higher order in which case a zero will be printed in that order, as previously explained. After the numbers have been set up and printed as described, the shaft 72 will continue to rotate until it completes a revolution. As will be apparent from Fig. 10, this continued rotation will cause the cams 85 and 88 to restore the racks and printing hammers to their original position.

Pivotally mounted on the shaft 60 (Figs. 10, 11 and 13) is a dog 89 adapted to coöperate with teeth 90 on the rotating scale drum. Secured to the dog 89 to move therewith, is a tail member 91 coöperating with a cam 92 secured to the shaft 72. As soon as the shaft 72 begins to rotate to operate the printing mechanism, the cam 92 will lift the tail 91 of the dog 89 and force the dog into contact with the teeth 90. By this mechanism, the scale drum is rigidly held from rotation during the computing and printing operation.

Mounted for rotation on the top of the casing 48, is a pair of ribbon spools 94 and 95 (Figs. 10 and 12). The ribbon spools have connected therewith bevel gears 96 and 97 respectively, adapted to mesh with bevel gears 98 and 99 carried on the shaft 100, which is free to slide longitudinally in the casing to connect either of the gears 98 or 99 with its coöperating ribbon spool. A spring catch 101 is provided to hold the shaft 100 in either of its two positions. It will be seen that when the shaft 100 is rotated, it will shift the ribbon from one spool to the other, the direction of movement depending upon which pair of bevel gears is in mesh. The shaft 100 is rotated by a ratchet wheel 102 which is given a step by step movement by the dog 103 (Figs. 10 and 13), carried on a sliding bar 104 (see also Fig. 11). The bar 104 is normally held in retracted position by spring 105 and is given a forward movement at each revolution of the shaft 72 by means of the cam 106. On the forward end of the bar 104 is a rack 107 which coöperates with a pinion 108 connected with the platen 109 around which the paper 110 is carried. The movement of the bar 104 takes place during the latter part of the rotation of the shaft 72 and after the computing and printing operations have been completed. This movement, as will be seen, feeds the paper 110 forwardly at the same time that it shifts the ribbon of the printing mechanism. The forward movement of the paper is sufficient to bring the number which has been printed thereon past the knife edge 111 against which the printed strip of paper may be pulled by the operator to tear off the portion thereof bearing the printed number. A pair of rollers 112 coöperate with the platen for holding the paper in place thereon, and a ratchet 113 is connected to the platen to prevent backward movement. A spring 114 (Figs. 10 and 17) is provided for each of the type bars for returning them to their original position after each printing operation.

From the above description, the operation of the device will be understood. The operator places the article to be weighed upon the scale pan 6, and the weight of the article presses the scale beam 3 downwardly against the tension of the springs 13 and the computing drum is rotated a distance proportional to the weight of the article placed upon the scale pan, by means of the racks 14 and pinions 17. During the weighing operation, the calculating and printing mechanism is held entirely out of contact with the scale drum, the shafts 37, 38 and 39 being held from rotation by the racks 54, 55 and 56, with their projections 84 and cam 85. These shafts in turn prevent forward movement of the racks 43, 44 and 45 and hold them in their retracted position, leaving the drum free to rotate under the influence of the weight upon the scale pan. The operator now moves the casing 33 along the front of the scale until the pointer 34 stands opposite the figure on the scale casing representing the price per pound of the article upon the scale pan. The casing 33 is accurately located by means of the detent 35 and depressions 36. As soon as the casing 33 has been properly set, the operator pulls the hand crank 64 forwardly as far as it will come and then releases it, allowing it to return under the influence of the spring 66. The forward movement of the hand crank produces no effect whatever upon the mechanism of the computing and printing device, but merely moves the dog 67 into position to catch a tooth on the ratchet 68. During the return movement of the hand crank, the dog 67 rotates the shaft 60 a quarter of a revolution and this in turn rotates the shaft 72 one complete revolution by means of the gear 70 and the pinion 71. The first effect of the rotation of the shaft 72 is to cause the cam 92 to force the dog 89 into contact with the ratchet teeth 90 and hold the drum from any movement during the computing and printing operation. Immediately after the locking of the drum described, the cam 85 releases the racks 54, 55 and 56 and leaves them free to move forwardly under the influence of their springs 86. This forward movement of the racks rotates the shafts 37, 38 and 39 and thus forces the racks 43, 44 and 45 respectively into contact with the corresponding rings of the particular drum segment opposite which the casing 33 has been previously set. The units rack will move forwardly a distance corresponding to the number of digits in the units order of the value of the article upon the scale pan, the tens rack will move forwardly a distance corresponding to the number of digits in the tens order of the number representing the value, and the hundreds rack will move forwardly a distance corresponding to the digit in the hundreds or dollar order of the value of the article. The movements of the racks 43, 44 and 45 will be stopped by the finger points 42 contacting with the steps on the corresponding circular rings. As will be apparent, the racks 54, 55 and 56, will move a distance equal to that through which their corresponding racks in the casing 33 have moved, and the printing segments 61 will be moved upwardly a corresponding distance to bring the proper digits on these printing segments into line with the printing hammers 74 and the printing ribbon. During the first part of the movement of the racks 54, 55 and 56 forwardly, the printing hammers 74 corresponding to these racks are released by the cam 82 on the mutilated gear 57 in a manner previously described. If any of the racks 43, 44 and 45 contact with the outermost step on its corresponding ring, that is the zero step, there will be no forward movement of that rack and the catch member 78 corresponding thereto will remain in contact with the corresponding printing hammer, unless there has been a movement of a rack of a higher denominational order, in which case the dog 78 will be released by the projection 83 on the catch member of the higher denominational order. By this means, it is provided that no printing will take place in any order in which there has been no movement of the rack, unless there has been a movement of a rack of a higher denominational order, in which case a zero will be printed in the order in which no movement of the rack has taken place. After the racks 54, 55 and 56 have moved forwardly under the influence of the springs 86, to set the printing segments in proper position, the printing hammers 73 are released by the cam 88 and moved forwardly by the spring 76 to print the number set up by the movement of the racks. Further rotation of the shaft 72 rotates the cam 106 to reciprocate the bar 104 and move the paper 110 with the printed value thereon, past the knife 111, where it may be torn off and handed to the customer or otherwise disposed of, according to the system in use. Ordinarily, this printed slip will bear some such legend as "Pay to cashier" and will be handed to the customer with the value of the article purchased printed thereon.

In some instances, especially in scales designed for articles of small weight the inertia of the drum 20, shown in the form illustrated in Figs. 1 to 17 inclusive, offers sufficient resistance to the operation of the device to make it desirable to relieve the weighing mechanism of the necessity of rotating this drum, and to provide other means to rotate the drum. The form of the invention shown in Figs. 18, 19 and 20 accomplishes this result, as will be understood from a description of these figures. In these figures the drum 20, instead of being mounted directly on the shaft 16, is shown to be carried by a hollow shaft 200 to rotate therewith. The shaft 200 is supported to freely rotate in a bearing 201 and carries a pinion 202 affixed thereto to rotate therewith. The pinion 202 meshes with the rack 203 which rotates the drum in a manner to be explained. Extending through the interior of the shaft 200 but entirely independent thereof is the shaft 16 which is mounted for rotation in the bearings 204, and mounted on the shaft 16 to rotate therewith is the pinion 15 adapted to be rotated by the rack 14 in the same manner as in the previously described form of the invention. Rigidly attached to the shaft 16 is a disk 205 carrying a stop lug 206. The stop lug 206 coöperates with an arm 207 rigidly attached to the hollow shaft 200 in a manner to be explained. The bearings for the shafts 16 and 200 are provided in duplicate, one at each end of the shaft, as are also the pinions, racks, and other mechanism described above. It will be seen that when a weight is placed upon the scale pan the shaft 16 will be rotated a distance proportional to the weight of the article upon the pan and will carry therewith the disk 205 and its stop lug 206. The drum 20, however, being mounted entirely independently of the shaft 16 will not be affected by the movement of the scale pan, the only parts moved being the shaft 16 and the parts immediately attached thereto. Referring to Fig. 20 it will be seen that the rack 203 is provided with a slot 208 through which the shafts 37, 38 and 39 extend, the rack being free to slide longitudinally of the slot upon these shafts. The spring 209 normally tends to draw the rack to the left, as viewed in Fig. 20, and to rotate the pinion 202 to move the drum 20 in the same direction that the disk 205 is moved by a weight upon the scale pan. The rack 203 is held from such movement except at such times as such movement is desired by means of the dog 210 (Figs. 19 and 20).

Referring to Figs. 18 and 19 it will be seen that the shaft 60 which carries the hand crank 64 has mounted on the end thereof extending to the right of the casing 48 in Fig. 18 two cam members 211 and 212. These cam members are secured to the hand crank 64 to rotate therewith. The dogs 210 are mounted on a shaft 213 which extends longitudinally of the device, there being a dog 210 on each end of the shaft in position to coöperate with each of the racks 203 to hold them in retracted position. Mounted on the end of the shaft 213 opposite the cam 212 and in position to coöperate therewith is an arm 214, as shown in Figs. 18, 19 and 20. Another shaft 215 extends longitudinally of the device and carries an arm 216 in position to coöperate with the cam 211. Secured to the shaft 215 in position to coöperate with ratchet teeth 217 on the disk 205 are pawls 218. The shaft 72 in this form of the invention is continued to extend the full length of the device and carries the mutilated gears 219 in position to coöperate with the racks 203. The shaft 72 in this form of the invention is given a complete revolution upon the return of the hand crank 64 in the same way as is shown in the form of the invention already described. The setting and printing mechanism is the same in this form of the invention as in the form described.

The operation of this form is as follows: The articles to be weighed are placed upon the scale pan and the racks 14 are drawn downwardly rotating the pinions 15 and the disks 205 which carry the stop members 206. This rotation will be in a clockwise direction as viewed in the Fig. 19 and will be proportional to the weight of the article upon the scale. During this weighing operation the drum 20 is entirely idle and the only parts moved are the shaft 16, the disks 205 and the stop lugs 206. The indicator 34 is set opposite the price of the article on the scale pan in the same manner as in the previously described form of the invention. The operator then draws the hand crank 64 forwardly, as before described. As soon as the hand crank begins to move forwardly the cam 211 will coöperate with the arm 216 to rotate the shaft 215 and force the pawls 218 into contact with the ratchet teeth 217 upon the disks 205. It will thus be seen that the first effect of the movement of the hand crank 64 will be to rigidly lock the disks 205 in the position to which they have been moved by the weight upon the scale pan. The pawl 218 will be held firmly in contact with the disk 205 during the entire forward and return movement of the hand crank 64 by means of the cam surface 220 contacting with the arm 216. A notch 221 is provided in the cam 212 to permit sufficient movement of the hand crank 64 to lock the disk 205 previous to movement of the arm 214 secured to the shaft 213. After the disk 205 has been locked, as described, the arm 214 is moved to the right in Fig. 19 rotating the shaft 213 in a clockwise direction and releasing the detent 210 from the rack 203. As soon as the rack 203 is thus released it is moved forwardly by the spring 209 rotating the pinion 202 and the drum 20 in the same direction that the disk 205 has previously been rotated. The rotation of the drum 20 will continue under the influence of the spring 209 until it is stopped by the arm 207 coming into contact with the stop lug 206 carried by the disk 205. In this manner the drum 20 is caused to rotate a distance proportional to the weight of the article upon the scale pan but this rotation is accomplished by a force entirely independent of the weight of the article. It should be remembered that the computing and printing mechanism is not affected by the forward movement of the hand crank 64. The only effect of this movement being, in the present form of the invention, to set the drum in position to coöperate with the computing and printing mechanism in the same way that it coöperates in the form of the invention previously described. The computing and printing operation is accomplished upon the return stroke of the hand crank 64 in the same way as in the previously described form. After this computing and printing operation is completed, and during the last part of the return stroke of the hand crank 64 the arms 214 and 216 will be permitted to return to the position shown in Fig. 19, thus removing the pawl 218 from contact with the disk 205, and also freeing the detent 210 to move into contact under the influence of its spring with the rack 203. The return of the rack 203 to its initial position is also accomplished during the return stroke of the hand crank 64 and after the computing and printing operation by means of the mutilated gears 219. During the latter part of rotation of the shaft 72 and after the cams mounted thereon for controlling the printing device have performed their operation the teeth on the mutilated gears 219 contact with the teeth on the rack 203 and draw the rack backwardly into its initial position. The detent 210 is released, as previously described, at the proper time to spring into contact with the notch in the rack and hold it in this retracted position. In this manner all of the parts are returned to their initial position and are ready for a second operation. It may be desirable, in this form, to set the cams on the shaft 72 farther forward than in the other form, so that sufficient time is left for restoration of racks 203 after the operation of the printing mechanism.

What I claim is:

1. The combination with a weighing scale, of a drum having a plurality of sets of graduated stops thereon, means independent of said scale for rotating said drum, means controlled by said scale for limiting the movement of said drum, mechanism adjustable relative to said drum and arranged to coöperate with different stop members thereon to compute values of articles upon said scale at different prices per unit volume, said mechanism including a series of slides, and resilient means for moving said slides into contact with said drum.

2. The combination with a weighing scale, of a drum having a plurality of graduated stop members thereon, means for rotating said drum an amount proportional to the weight of an article upon said scale, slides arranged to coöperate with the stop members on said drum for computing the value of an article upon said scale, means for moving said slides toward and away from said drum, shafts having their axes stationary relative to said drum and arranged to be rotated by said slides, and means operated by said shafts for indicating computed values.

3. The combination with a weighing scale, of a drum having a plurality of graduated stop members thereon, means independent of said scale for rotating said drum, means controlled by said scale for limiting the movement of said drum, a plurality of shafts extending longitudinally of said drum, slides movable transversely of said shafts and arranged to rotate said shafts, resilient means for moving said slides into contact with said drum to cause said slides to coöperate with the stop members on said drum to perform a computing operation, said slides being movable longitudinally of said shafts and drum to bring said slides into position to coöperate with different stop members on said drum, means for holding said slides out of contact with said drum during the rotation of said drum, mechanism for releasing said holding means to cause a computing operation, and mechanism operated by said shafts for indicating computed values.

4. The combination with a weighing scale, of computing mechanism controlled thereby comprising a drum, means arranged to be moved by said scale an amount proportional to the weight of an article thereon for limiting the movement of said drum, a spring for rotating said drum, means for holding said spring to prevent operation thereof, and mechanism for securing said scale-moved drum limiting means in fixed position and subsequently releasing said spring to permit rotation of said drum.

5. The combination with a weighing scale, of a member arranged to be moved thereby an amount proportional to the weight of an article, of computing mechanism comprising a drum having graduated stops thereon, a spring for rotating said drum, and mechanism for securing said scale-moved member in position and subsequently releasing said spring to cause rotation of said drum to bring said drum into contact with said member and thus limit the movement thereof.

6. The combination with a weighing scale, of computing mechanism comprising a drum having a series of graduated stops thereon, a spring for rotating said drum, a member controlled by said scale for limiting the rotation of said drum, means for holding said member against movement while it coöperates with said drum, a series of shafts extending longitudinally of said drum, slides for rotating said shafts and adjustable longitudinally thereof into position to coöperate with different stop members on said drum corresponding to different prices per unit weight, recording mechanism operated by said shafts, springs for moving said slides into contact with said stop members, and control mechanism for governing the sequence of operation of the parts named so that said scale-moved member shall be secured in position before the rotation of said drum and said drum shall reach its limit of movement before the operation of said slides under the influence of their springs.

In testimony whereof I have signed my name to this specification, in the presence of two subscribing witnesses, on this 16th day of January A. D. 1915.

OTTO MALCHER.

Witnesses:
 CHARLES H. SEEM,
 A. J. CRANE.